US011865833B2

(12) United States Patent
Matsunaga et al.

(10) Patent No.: US 11,865,833 B2
(45) Date of Patent: Jan. 9, 2024

(54) PRINTING DEVICE

(71) Applicant: Seiko Epson Corporation, Tokyo (JP)

(72) Inventors: Hideki Matsunaga, Shiojiri (JP); Daisuke Yanagimachi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/481,929

(22) Filed: Sep. 22, 2021

(65) Prior Publication Data

US 2022/0097418 A1 Mar. 31, 2022

(30) Foreign Application Priority Data

Sep. 25, 2020 (JP) ................................ 2020-160632

(51) Int. Cl.
*B41J 11/00* (2006.01)
*B41J 15/04* (2006.01)

(52) U.S. Cl.
CPC ........ *B41J 11/0075* (2013.01); *B41J 11/0095* (2013.01); *B41J 15/042* (2013.01)

(58) Field of Classification Search
CPC .... B41J 11/0075; B41J 11/0095; B41J 15/042
See application file for complete search history.

(56) References Cited

U.S. PATENT DOCUMENTS

2001/0039893 A1* 11/2001 Kawakami ............... B41J 29/02 101/288
2006/0173576 A1* 8/2006 Goerg ................ A47K 10/3662 700/236
2007/0278083 A1* 12/2007 Iso ....................... H01H 13/702 200/512
2008/0101843 A1* 5/2008 Murahashi ........... B41J 11/0095 400/708
2012/0224905 A1 9/2012 Nihashi
2014/0151491 A1* 6/2014 Mizutani .............. B65H 26/063 242/563
2017/0255152 A1* 9/2017 Okamura ............... G03G 15/80
2019/0268483 A1* 8/2019 Sakashita ........... H04N 1/00405
2019/0268485 A1* 8/2019 Sakashita ........... H04N 1/00251
2019/0384588 A1* 12/2019 Yagi .................. H04N 1/00384

FOREIGN PATENT DOCUMENTS

JP 2011-110805 6/2011
JP 2012-184056 9/2012

* cited by examiner

*Primary Examiner* — David H Banh
(74) *Attorney, Agent, or Firm* — WORKMAN NYDEGGER

(57) ABSTRACT

A printing device includes a main body, an opening/closing cover that is coupled to the main body and moves to an open position or a closed position, a roll paper holder provided on the main body and configured to accommodate a first roll paper, and a remaining amount detecting section that detects a remaining amount of the first roll paper accommodated in the roll paper holder, and the remaining amount detecting section shifts from a first state in which the remaining amount of the first roll paper is not detected to a second state in which the remaining amount of the first roll paper is detected, with movement of the opening/closing cover from the open position to the closed position.

6 Claims, 15 Drawing Sheets

PRINTING DEVICE

The present application is based on, and claims priority from JP Application Serial Number 2020-160632, filed Sep. 25, 2020, the disclosure of which is hereby incorporated by reference herein in its entirety.

BACKGROUND

1. Technical Field

The present disclosure relates to a printing device.

2. Related Art

Printing devices in the related art are known that include a remaining amount detecting section for detecting a remaining amount of roll paper (see, for example, JP-A-2012-184056).

The remaining amount detecting section includes an arm that is provided on the outer surface side of a side plate of a hopper that holds the roll paper, is swingable toward the side plate, and is urged by a spring, and a protrusion formed at an end of the arm to penetrate the side plate. When the outer diameter of the roll paper is large, the protrusion is in contact with the side surface of the roll paper; in contrast, when the outer diameter of the roll paper is small, the protrusion enters the hollow portion of the winding core of the roll paper, causing the arm to swing. As a result, the swing of the arm is detected by the sensor, and a low remaining amount of the roll paper is detected.

In JP-A-2012-184056, when the roll paper is loaded and unloaded in and out of the hopper of the printing device, the roll paper or the hand of a user interferes with the remaining amount detecting section when the protrusion or the like of the remaining amount detecting section projects to a roll paper accommodating section, which may cause a problem.

SUMMARY

According to an aspect of the present disclosure, there is provided a printing device including a main body, an opening/closing cover configured to be coupled to the main body and configured to move to an open position or a closed position, a roll paper holder configured to be provided on the main body and configured to accommodate a first roll paper, and a remaining amount detecting section configured to detect a remaining amount of the first roll paper accommodated in the roll paper holder, in which the remaining amount detecting section is configured to shift from a first state in which the remaining amount of the first roll paper is not detected to a second state in which the remaining amount of the first roll paper is detected, with movement of the opening/closing cover from the open position to the closed position.

DESCRIPTION OF EXEMPLARY EMBODIMENTS

Hereinafter, embodiments to which the present disclosure are applied will be described with reference to the drawings. In each figure, for convenience of understanding, each member is illustrated on a scale different from the actual one.

Figure 1:
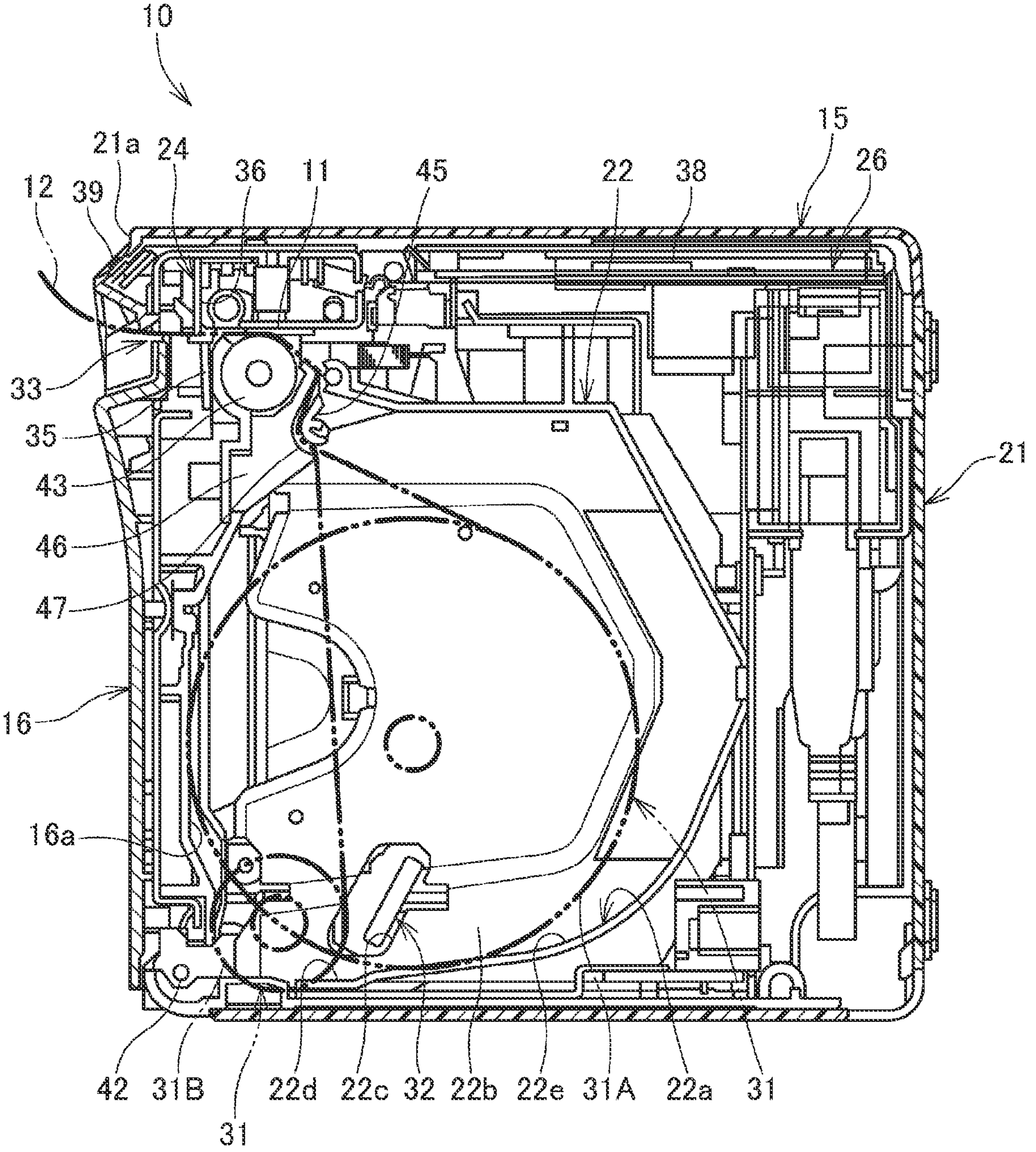
FIG. 1 is a side sectional view of a printing device according to an embodiment of the present disclosure when viewed from the side.
Figure 2:
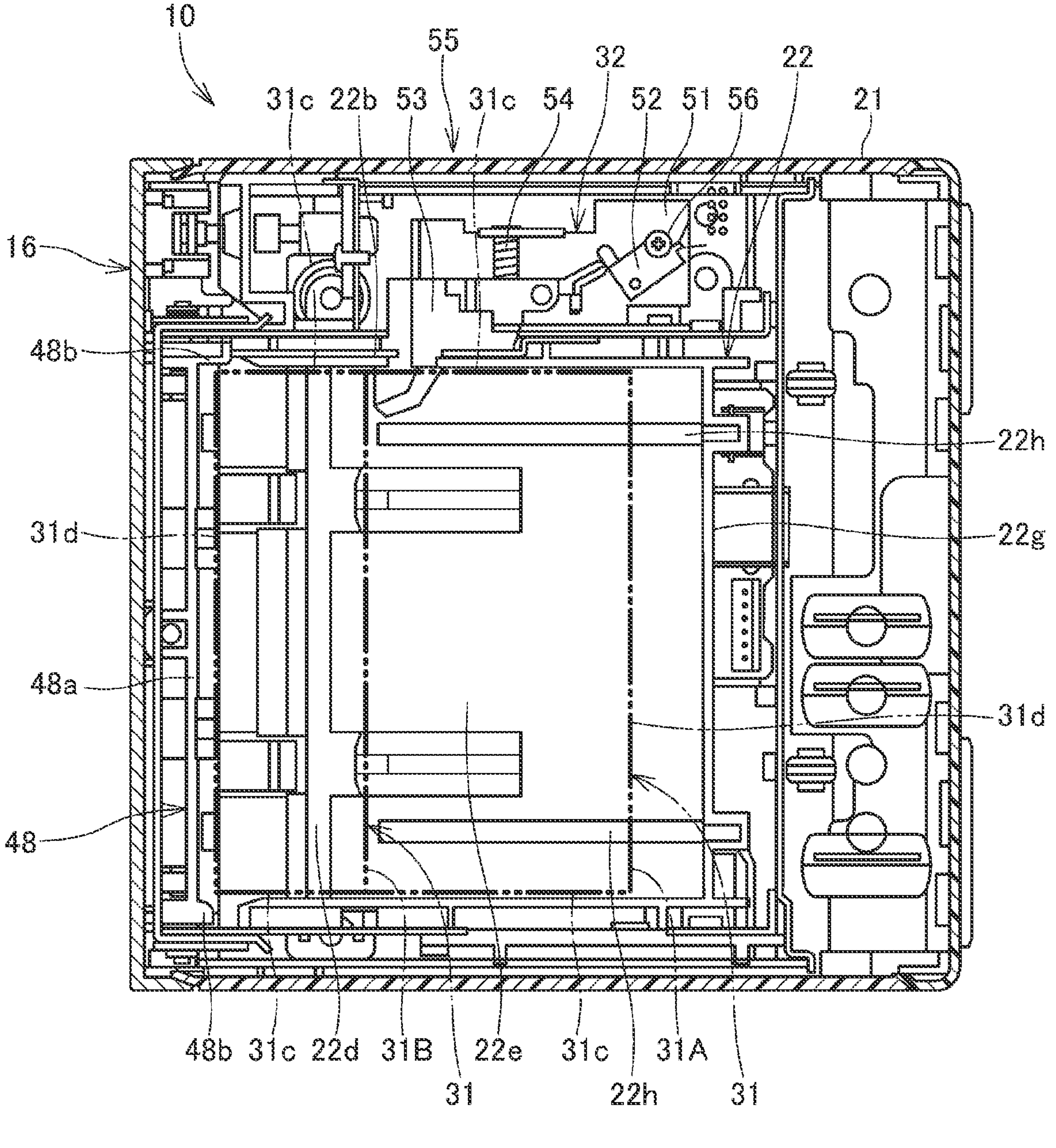
FIG. 2 is a top sectional view of the printing device when viewed from above.

FIG. 1 is a side sectional view of a printing device 10 according to an embodiment of the present disclosure when viewed from the side, and FIG. 2 is a top sectional view of the printing device 10 when viewed from above.

As shown in FIG. 1, a printing device 10 records information such as characters and images on a recording surface of a thermal paper 12, which is a recording medium, by a thermal head 11 in which a plurality of heat generating resistors are arranged in a line. The thermal paper 12 corresponds to an example of a recording paper.

The printing device 10 has a box shape and includes a main body 15 and an opening/closing cover 16 provided on the front portion of the main body 15 to be open/closed.

The main body 15 accommodates a roll paper holder 22, the thermal head 11, a part of a cutter unit 24, and a substrate 26 in a resin case 21. The cutter unit 24 corresponds to an example of a cutting mechanism.

The case 21 forms a cover that covers an upper portion of the front surface, both side surfaces, the upper surface, the lower surface, and the back surface of the main body 15.

The roll paper holder 22 accommodates the roll paper in which the thermal paper 12 is rolled into a roll shape. The printing device 10 can use the thermal paper 12 having a different paper width as a recording medium. In the present embodiment, an example in which a first roll paper 31 having a predetermined width and a second roll paper 61 having a paper width narrower than that of the first roll paper 31 are used will be described. When the second roll paper 61 is used in the printing device 10, roll paper guides 65 and 66, which will be described later, are mounted on the roll paper holder 22 corresponding to the narrow paper width. FIG. 2 shows the printing device 10 in a state in which the roll paper guides 65 and 66, which will be described later, are not mounted, which is in a state in which the first roll paper 31 can be accommodated.

The roll paper holder 22 includes a placement portion 22*a* on which the first roll paper 31 is placed, and an opening 22*c* opened in a side wall 22*b* on one left side when the printing device 10 is viewed from the front. The side wall 22*b* corresponds to an example of a first side wall.

The placement portion 22*a* includes a bottom 22*d* formed to be the lowest and flat in the placement portion 22*a* at a front end thereof, and a slope 22*e* curved so as to gradually increase from the rear end of the bottom 22*d* toward the rear. Assuming that the first roll paper 31 having a large outer diameter at the beginning of use is a first roll paper 31A, the first roll paper 31A is placed on the slope 22*e* and is held in a state of being in contact with the inner surface 16*a* of the opening/closing cover 16 in the roll paper holder 22.

Assuming that the first roll paper 31 of which outer diameter has been decreased up to less than a predetermined value due to the consumption of the thermal paper 12 is a first roll paper 31B, the first roll paper 31B is located at the bottom 22*d*.

In the figure, the contours and winding cores of the first roll papers 31A and 31B and the thermal paper 12 drawn from the first roll papers 31A and 31B are shown by double-dashed lines.

The printing device 10 of the present embodiment includes a remaining amount detecting section 32 for detecting the first roll paper 31B in order to prompt replacement of the first roll paper 31B of which an outer diameter has been decreased up to less than the predetermined value. A part of the remaining amount detecting section 32 is exposed to the first roll paper 31 from the opening 22*c* of the roll paper holder 22.

The thermal head 11 is disposed above a platen 43 provided on the opening/closing cover 16 to face the platen 43. The thermal paper 12 drawn from the first roll paper 31 is interposed between the thermal head 11 and the platen 43, and the thermal paper 12 is transported forward by the rotational drive of the platen 43 and characters and images are recorded on the thermal paper 12 by the thermal head 11.

The cutter unit 24 includes a fixed blade 35 and a movable blade 36 arranged close to a paper outlet 33 of the thermal paper 12 with respect to the thermal head 11 and the platen 43 and a cutter drive motor (not shown) for driving the movable blade 36. The fixed blade 35 is arranged on the opening/closing cover 16, and the movable blade 36 is arranged on the main body 15. The movable blade 36 descends and cooperates with the fixed blade 35 to sandwich the thermal paper 12, and cuts a part or the whole of the thermal paper 12. When a partial cut for cutting a part of the thermal paper 12 is performed, the central portion of the paper width of the thermal paper 12 is not cut, and thus the user tears off the uncut portion of the thermal paper 12 to cut it.

The fixed blade 35 corresponds to an example of a second blade, and the movable blade 36 corresponds to an example of a first blade.

The substrate 26 is disposed at the rear portion of the upper portion of the printing device 10, and includes a controller 38 that controls each portion of the printing device 10. Further, the front surface 21*a* of the case 21 of the main body 15 is provided with a display 39 for displaying each state of the printing device 10. The display 39 is an indicator that displays the operating state and the like of the printing device 10. The display 39 displays, for example, the low remaining amount of the thermal paper 12 as will be described later according to the control of the controller 38. The controller 38 corresponds to an example of a processor.

The opening/closing cover 16 is swingably supported on the lower end of the front portion of the main body 15 via a hinge shaft 42. The opening/closing cover 16 can be temporarily fixed to the main body 15. The opening/closing cover 16 includes the platen 43 and the fixed blade 35 arranged in front of the platen 43 at the upper portion.

The platen 43 is rotatably supported by the opening/closing cover 16. The platen 43 not only functions as a base for supporting the thermal paper 12 during recording, but also serves as a transport mechanism for the thermal paper 12.

Next, a transport path of the thermal paper 12 will be described below.

The main body 15 includes a first paper guide portion 45 above the roll paper holder 22. Further, the opening/closing cover 16 includes a second paper guide portion 46 below the platen 43, and the second paper guide portion 46 is disposed in front of the first paper guide portion 45. The first paper guide portion 45 and the second paper guide portion 46 are disposed at a predetermined distance in a front-rear direction, and an upstream transport path 47 is provided between the first paper guide portion 45 and the second paper guide portion 46.

The thermal paper 12 drawn from the first roll paper 31A contacts the first paper guide portion 45 on the inlet side of the upstream transport path 47 and contacts the second paper guide portion 46 on the outlet side of the upstream transport path 47. Then, the thermal paper 12 passes between the platen 43 and the thermal head 11 located downstream in the upstream transport path 47, and transported in front of the printing device 10 via a paper outlet 33 between the front end of the main body 15 and the opening/closing cover 16.

Further, the thermal paper 12 drawn from the first roll paper 31B contacts the second paper guide portion 46 on the inlet side of the upstream transport path 47, and further, contacts the first paper guide portion 45 at the intermediate portion of the upstream transport path 47 and again contacts the second paper guide portion 46 on the outlet side of the upstream transport path 47. Then, a downstream portion of the upstream transport path 47 traces the same transport path as the thermal paper 12 of the first roll paper 31A.

As shown in FIG. 2, the roll paper holder 22 is formed in a rectangular shape in a plan view, and includes a pair of right and left side walls 22*f* and 22*b* and a rear wall 22*g* coupled to respective rear ends of the right and left side walls 22*f* and 22*b*. The right and left side walls 22*f* and 22*b* hold both side surfaces 31*c* of the first roll paper 31. The side wall 22*f* corresponds to an example of a second side wall.

The opening/closing cover 16 includes, in front of the roll paper holder 22, a roll paper abutting portion 48 on which the first roll paper 31 abuts. The roll paper abutting portion 48 is formed in a concave shape with the rear portion being opened, and includes a front wall 48*a* and a pair of right and left side walls 48*b*. An outer peripheral surface 31*d* of the first roll paper 31 contacts the front wall 48*a*, and both side surfaces 31*c* of the first roll paper 31 are held by the right and left side walls 48*b*.

On the side of the side wall 22*b*, the remaining amount detecting section 32 is disposed for detecting the remaining amount of the first roll paper 31, that is, the first roll paper 31 of which the diameter is less than a predetermined outer diameter.

The remaining amount detecting section 32 includes a base 51, a detection switch 52 provided on the base 51, a first detection lever 53, and a first compression coil spring 54.

The first detection lever 53 corresponds to an example of a first projection main body, and the first compression coil spring 54 corresponds to an example of a first urging portion.

The base 51 is fixed to the case 21. The detection switch 52 is attached to the base 51 and turns on or off depending on the swing state of the first detection lever 53.

The first detection lever 53 is swingably supported by the base 51 via a support shaft 57, and the swing state of the first detection lever 53 is transmitted to the detection switch 52. The first compression coil spring 54 urges the first detection lever 53 to swing inward of the roll paper holder 22.

The first detection lever 53 and the first compression coil spring 54 constitute a first projection 55.

The first detection lever 53 is swingably supported by the base 51 via the support shaft 57; however, the present disclosure is not limited thereto. For example, the first detection lever 53 may be provided on the base 51 to be slidable so that the entire first detection lever 53 moves.

A detailed structure and operation of the remaining amount detecting section 32 described above will be described below.

Figure 3:
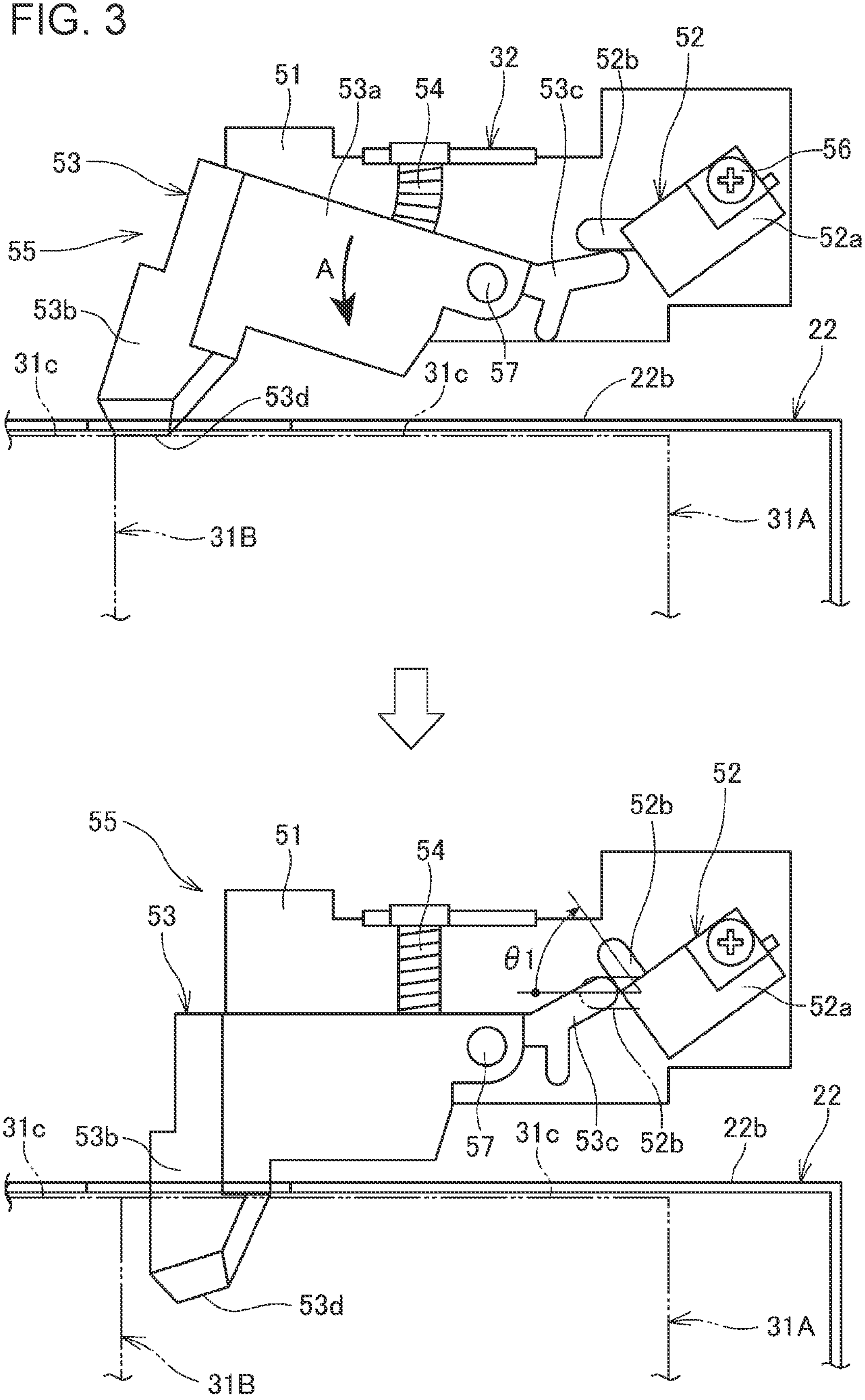
FIG. 3 is a diagram illustrating a detailed structure and operation of a remaining amount detection mechanism.

FIG. 3 is an operation diagram illustrating a detailed structure and operation of the remaining amount detecting section 32.

The detection switch 52 includes a switch main body 52*a* attached to the base 51 with screws 56, and a detector 52*b* swingably provided on the switch main body 52*a*. The detector 52*b* is swingably supported around a swing shaft (not shown) and is urged counterclockwise by an urging member (not shown). The switch main body 52*a* is turned on or off depending on the swing position of the detector 52*b*.

The first detection lever 53 includes a lever base 53*a* provided on the support shaft 57 and a first protrusion 53*b* formed at the tip end of the lever base 53*a*. The lever base 53*a* includes an arm portion 53*c* projecting toward the detection switch 52, and the arm portion 53*c* is in contact with the detector 52*b* of the detection switch 52.

The first compression coil spring 54 urges the first detection lever 53 to swing inward of the roll paper holder 22.

A tip end 53*d* of the first protrusion 53*b* of the first detection lever 53 is pressed against the side surface 31*c* of the first roll paper 31A. In this state, the arm portion 53*c* of the first detection lever 53 contacts the detector 52*b* of the detection switch 52, and thus the detector 52*b* is in a position extending in the front-rear direction. When the detector 52*b* is at this position, the detection switch 52 is in the off state.

When the thermal paper 12 of the first roll paper 31A is consumed in this state and becomes the first roll paper 31B having the outer diameter less than a predetermined value, the tip end 53*d* of the first protrusion 53*b* does not come into contact with the side surface 31*c* of the first roll paper 31B. As a result, the first detection lever 53 swings counterclockwise around the support shaft 57 by the urging force of the first compression coil spring 54, as shown by arrow A, and is shown by the white arrow, and the first protrusion 53*b* shifts to a state of projecting into the roll paper holder 22.

At this time, as the arm portion 53*c* of the first detection lever 53 swings, the detector 52*b* of the detection switch 52 swings clockwise by an angle θ1 from the state before the swing of the first detection lever 53. As a result, the detection switch 52 is turned from OFF to ON, and this on signal is input to the controller 38.

The controller 38 controls the display 39 to display the fact that the remaining amount of the first roll paper 31 is low, based on the on signal from the detection switch 25.

In this way, the position where the first protrusion 53*b* of the first detection lever 53 projects from the side wall 22*b* to the inside of the roll paper holder 22 is defined as a first position. In a state where the first detection lever 53 projects into the roll paper holder 22, the first detection lever 53 contacts a stopper (not shown) provided on the base 51 or the roll paper holder 22 while receiving the urging force from the first compression coil spring 54 and becomes stationary.

Further, the position where a projecting amount of the first protrusion 53*b* of the first detection lever 53 from the side wall 22*b* to the inside of the roll paper holder 22 is less than that at the first position or the first protrusion 53*b* does not project is defined as a second position. As described above, the first protrusion 53*b* of the first detection lever 53 can move between the first position and the second position.

Subsequently, a configuration when the second roll paper 61 is accommodated in the printing device 10 will be described.

Figure 4:
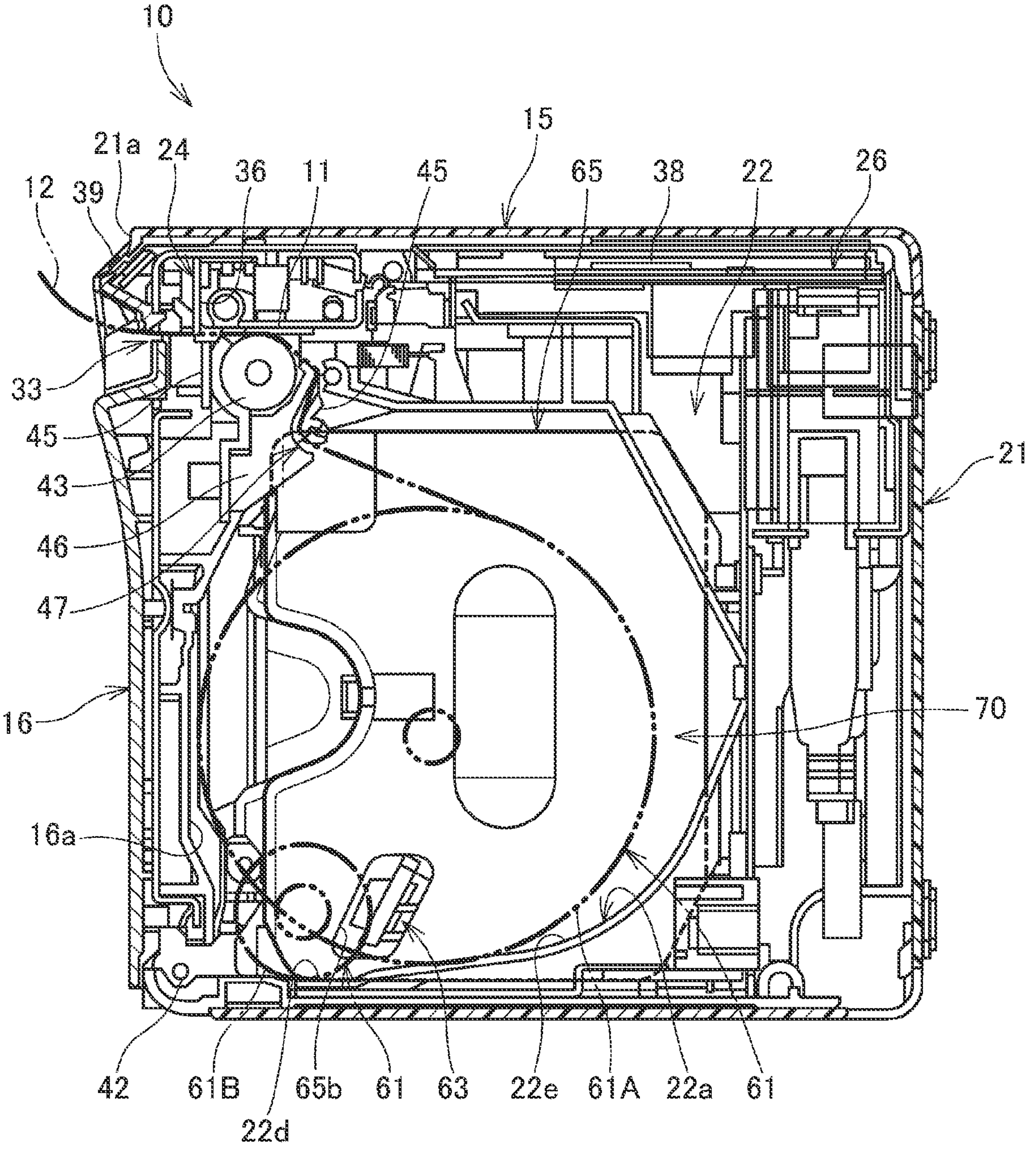
FIG. 4 is a side sectional view illustrating a state in which a roll paper guide is mounted on a roll paper holder.
Figure 5:
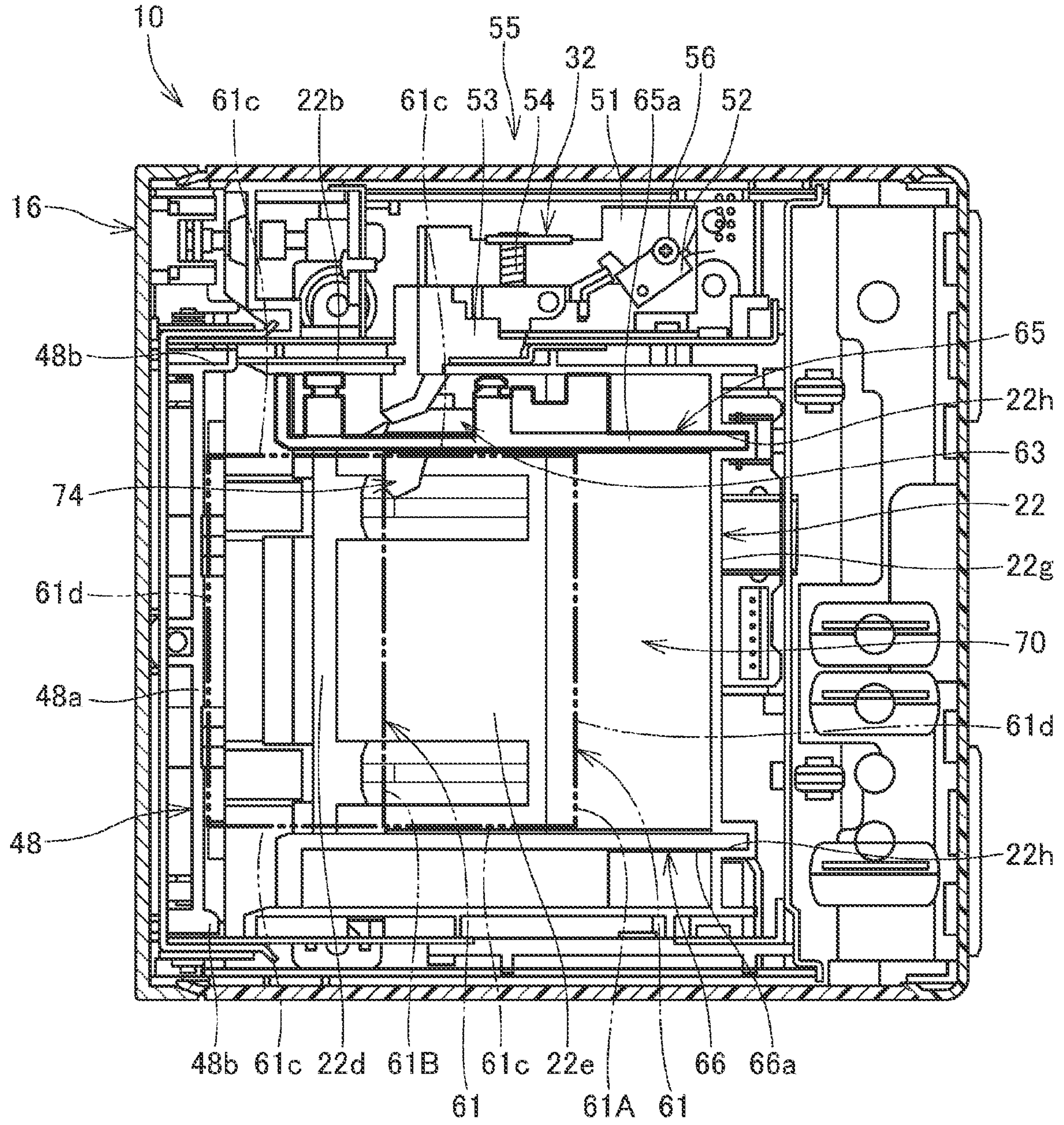
FIG. 5 is a plan sectional view illustrating a state in which roll paper guides are mounted on the roll paper holder.

FIG. 4 is a side sectional view illustrating a state in which the roll paper guide 65 is mounted on the roll paper holder 22, and FIG. 5 is a plan sectional view illustrating state in which a pair of right and left roll paper guides 66 and 65 are mounted on the roll paper holder 22. In the roll paper guide 65 shown in FIGS. 4 and 5, the contour is drawn with a thick line in order to facilitate understanding of the shape.

As shown in FIGS. 4 and 5, the roll paper guides 65 and 66 are members that stabilize the second roll paper 61, which has a narrower paper width than the first roll paper 31, in the roll paper holder 22 by being mounted on the roll paper holder 22.

On the roll paper holder 22, a pair of right and left guide mounting groove portions 22*h* are formed that extends in the front-rear direction in a plan view. The roll paper guides 65 and 66 for holding the second roll paper 61, which has the narrower paper width than the first roll paper 31, are mounted on the right and left guide mounting groove portions 22*h*. The roll paper guide 65 is disposed close to the side wall 22*b* of the roll paper holder 22, and the roll paper guide 66 is disposed close to the side wall 22*f* of the roll paper holder 22. By mounting the roll paper guides 65 and 66, the space for accommodating the second roll paper 61 in the roll paper holder 22 is narrowed, and the second roll paper 61 is stabilized.

The roll paper guide 65 on the left side is provided with a detection assistance section 63 for assisting the remaining amount detecting section 32 in detecting the remaining amount, and the roll paper guide 66 on the right side is not provided with the remaining amount detecting section 32.

The right and left roll paper guides 66 and 65 are provided with side walls 66*a* and 65*a* for holding the side surface 61*c* of the second roll paper 61, respectively. Further, one roll paper guide 65 is provided with an opening 65*b* in the side wall 65*a*. Through the opening 65*b*, the detection assistance section 63 is exposed to a roll paper accommodating space 70 between the right and left roll paper guides 66 and 65. The roll paper guide 65 corresponds to an example of a partition portion, a first partition section, and the roll paper guide 66 corresponds to an example of a partition portion, a second partition section. Further, the side wall 65*a* corresponds to an example of a third side wall, and the side wall 66*a* corresponds to an example of a fourth side wall.

Assuming that the second roll paper 61 having a large outer diameter at the beginning of use is a second roll paper 61A, the second roll paper 61A is placed on the slope 22*e* and is held in a state of being in contact with the inner surface 16*a* of the opening/closing cover 16 in the roll paper holder 22.

Assuming that the second roll paper 61 of which outer diameter has been decreased up to less than a predetermined value due to the consumption of the thermal paper 12 is a second roll paper 61B, the second roll paper 61B is located at the bottom 22*d*.

The printing device 10 of the present embodiment includes the detection assistance section 63 for assisting the remaining amount detecting section 32 in detecting the remaining amount in order to prompt the replacement of the second roll paper 61B.

Hereinafter, the roll paper guide 65 including the detection assistance section 63 will be described.

Figure 6:
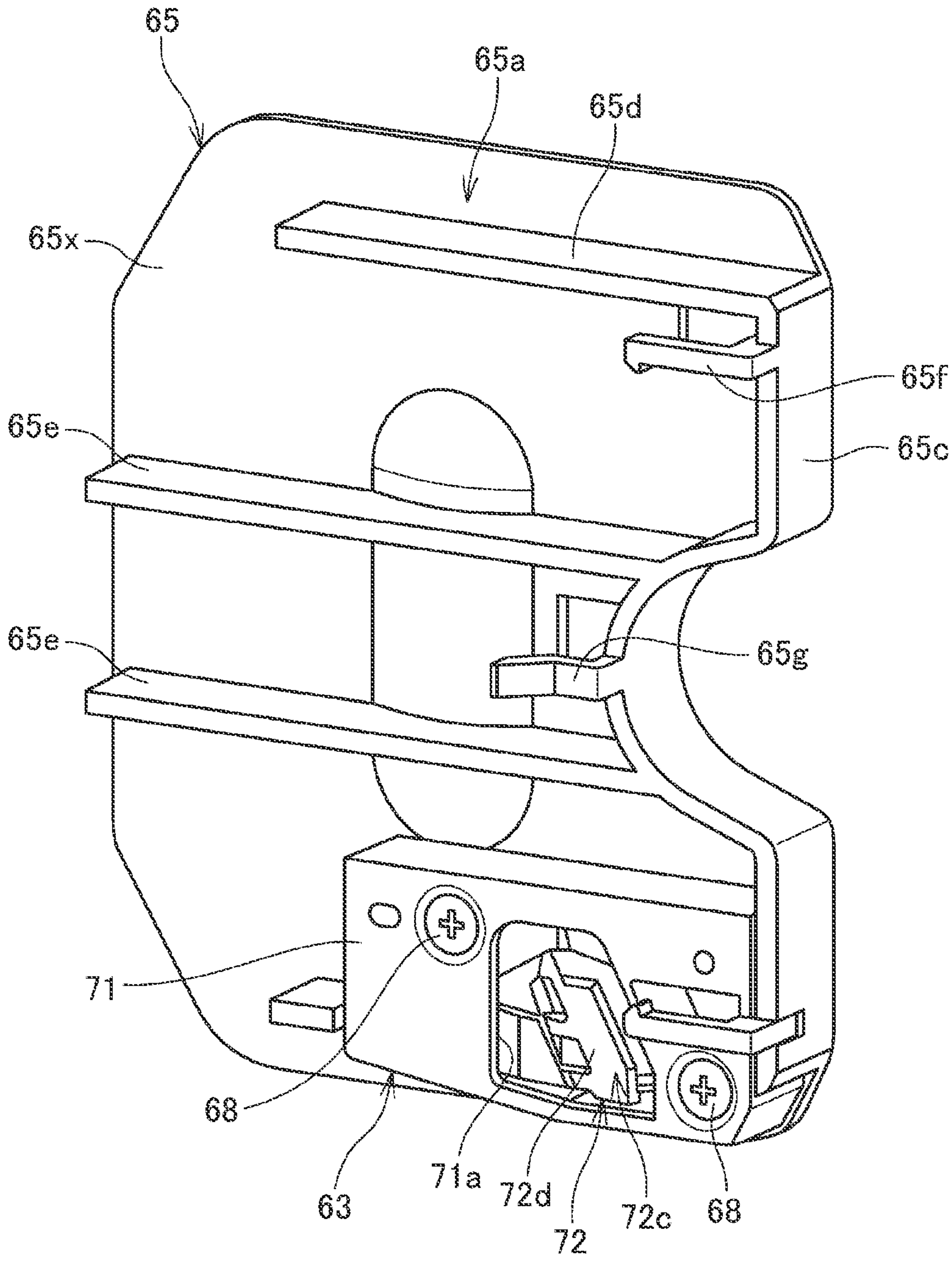
FIG. 6 is a first perspective view illustrating the roll paper guide and a detection assistance section.
Figure 7:
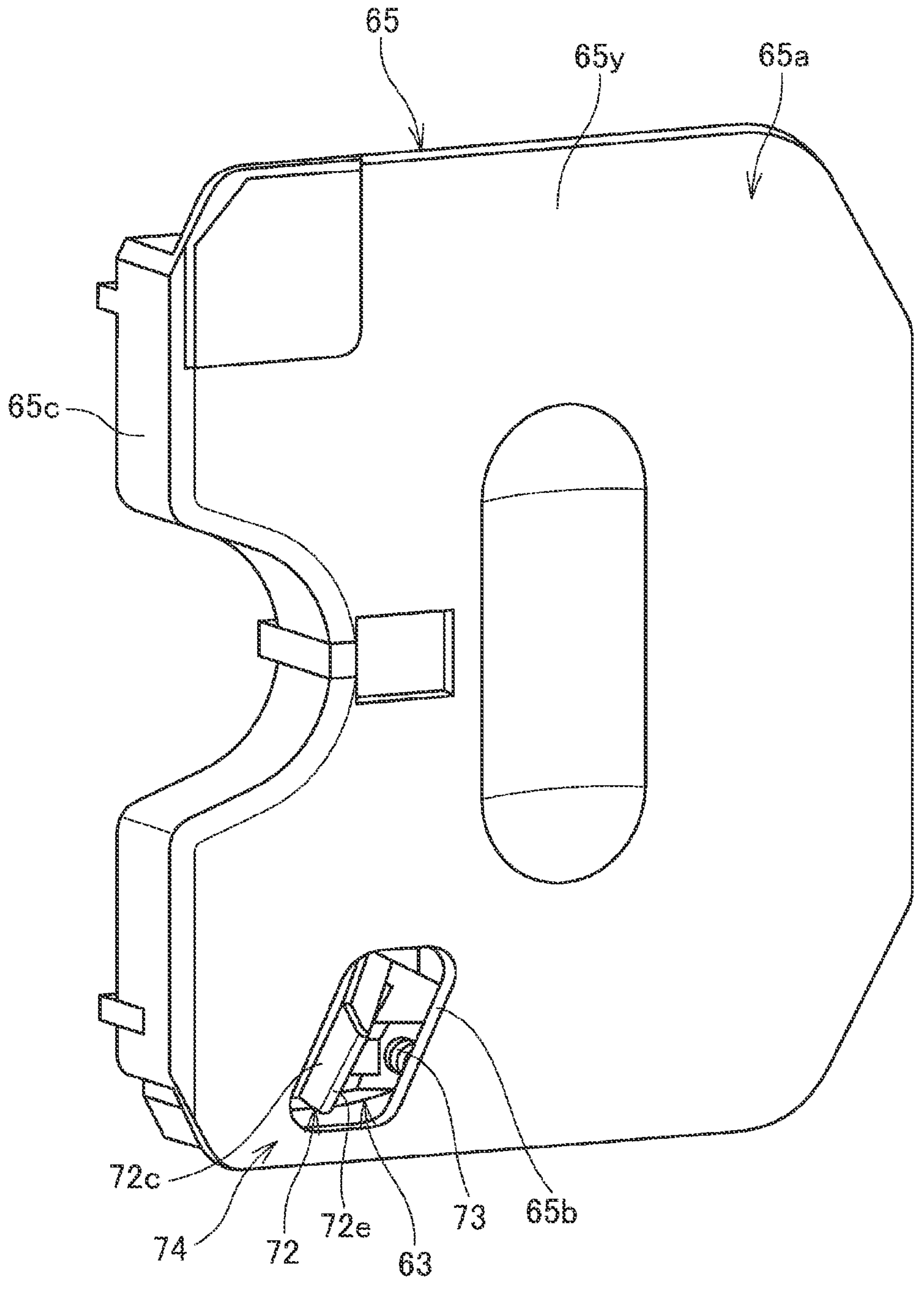
FIG. 7 is a second perspective view illustrating the roll paper guide and the detection assistance section.

FIG. 6 is a first perspective view illustrating the roll paper guide 65 and the detection assistance section 63, and FIG. 7 is a second perspective view illustrating the roll paper guide 65 and the detection assistance section 63. FIG. 6 is a perspective view when viewed from an outer surface 65*x*'s side of the side wall 65*a*, and FIG. 7 is a perspective view when viewed from the inner surface 65*y*'s side of the side wall 65*a*.

As shown in FIG. 6, the roll paper guide 65 includes the side wall 65*a*, a vertical rib 65*c* extending laterally from the front edge of the side wall 65*a*, and a plurality of lateral ribs 65*d* and 65*e* extending rearward on the side wall 65*a* from the upper portion and the intermediate portion of the vertical rib 65*c* in a vertical direction, respectively.

The vertical rib 65*c* and the plurality of lateral ribs 65*d* and 65*e* are portions for increasing the rigidity of the side wall 65*a*.

Further, the vertical rib 65*c* includes a plurality of engaging portions 65*f* and 65*g* that project rearward from the upper portion and the intermediate portion in the vertical direction, apart from the side wall 65*a*. The plurality of engaging portions 65*f* and 65*g* are portions that are engaged with the roll paper holder 22 when the roll paper guide 65 is mounted on the roll paper holder 22.

As shown in FIGS. 6 and 7, the detection assistance section 63 is constituted by a detecting section cover 71 attached to the lower portion of the side wall 65*a* with a plurality of screws 68, and a second detection lever 72 accommodated in the detecting section cover 71 and a second compression coil spring 73. The second detection lever 72 corresponds to an example of a second projection main body, and the second compression coil spring 73 corresponds to an example of a second urging portion.

The detecting section cover 71 includes a cover opening 71*a* through which the second detection lever 72 is exposed.

The second detection lever 72 is urged by the second compression coil spring 73 toward the side wall 22*b* of the roll paper holder 22 on the left. In FIG. 7, the second detection lever 72 does not project through the opening 65*b* of the side wall 65*a* due to the urging force of the second compression coil spring 73. However, when the first detection lever 53 of the remaining amount detecting section 32 projects into the roll paper holder 22, the second detection lever 72 is pushed by the first detection lever 53 to project through the opening 65*b*.

The second detection lever 72 and the second compression coil spring 73 constitute a second projection 74.

Figure 8:
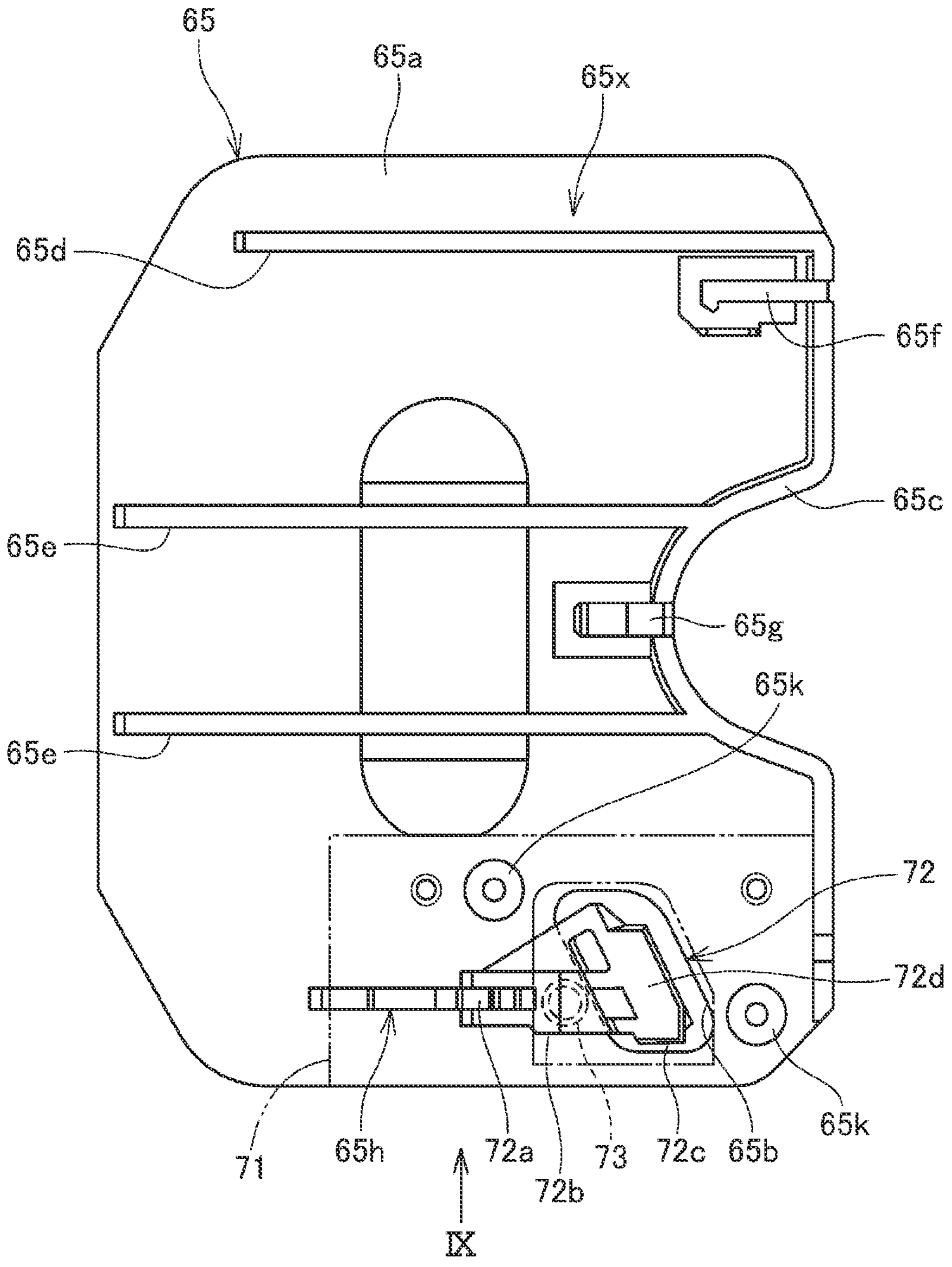
FIG. 8 is a side view illustrating a state in which a detecting section cover is removed from the state of FIG. 6.
Figure 9:
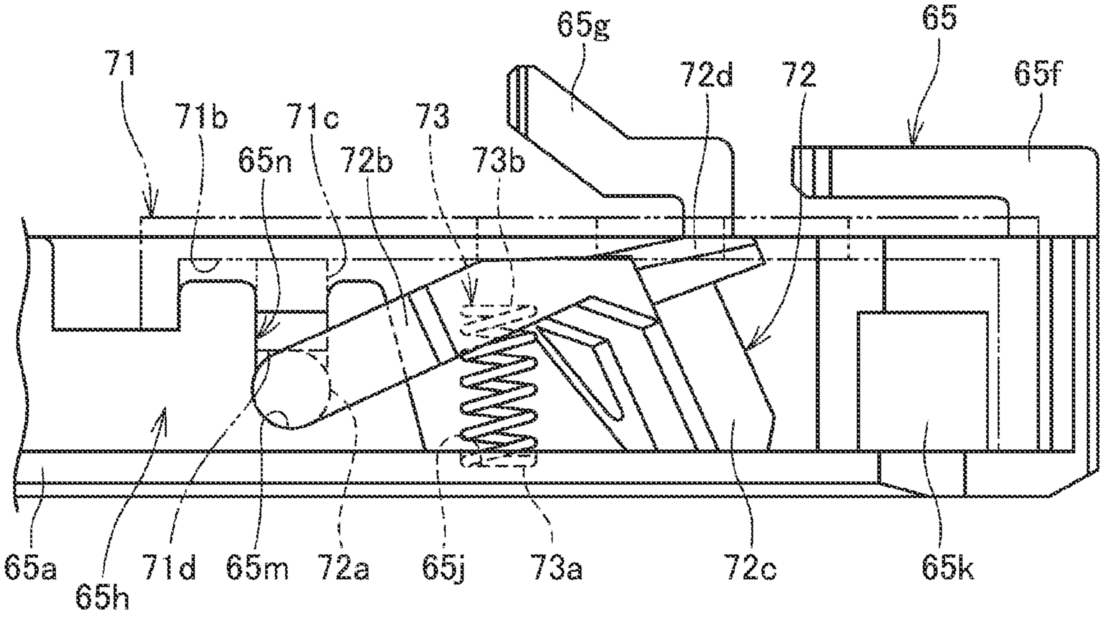
FIG. 9 is a view when seen from arrow IX of FIG. 8.
Figure 10:
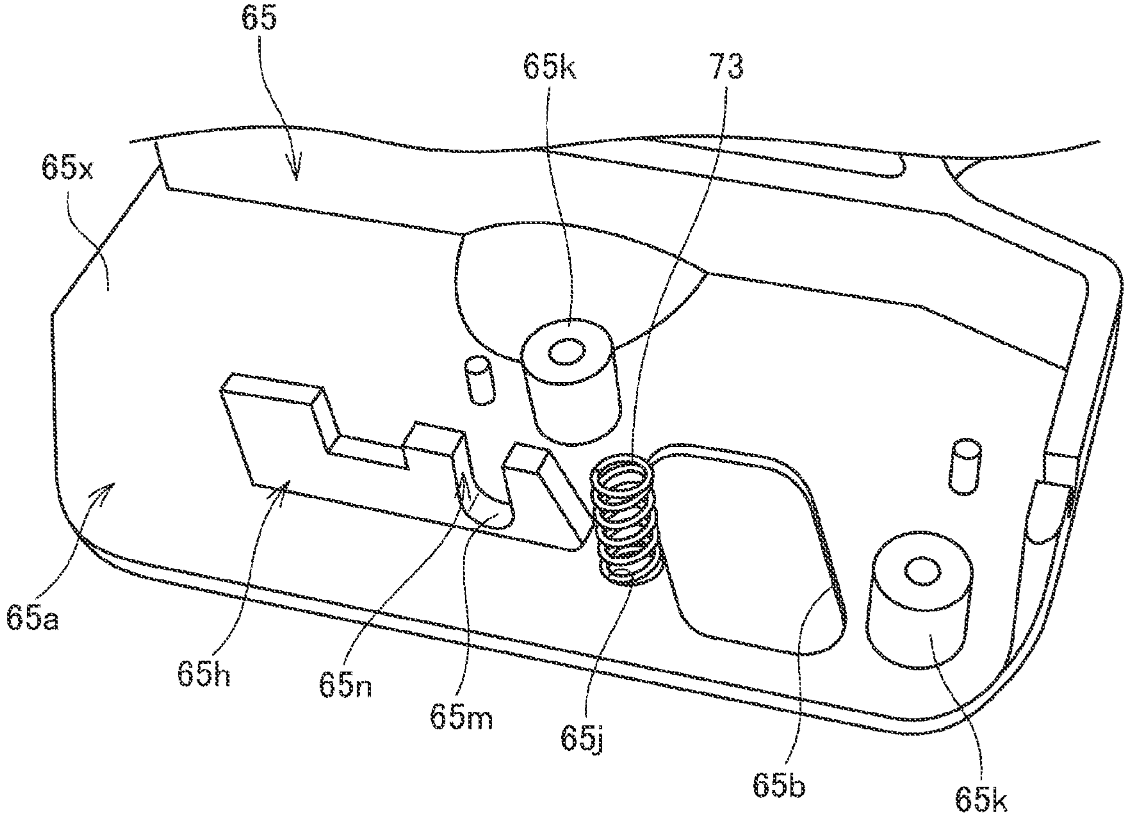
FIG. 10 is a main part perspective view illustrating a state in which a second detection lever is removed from the state of FIG. 8.

FIG. 8 is a side view illustrating a state in which the detecting section cover 71 is removed from the state of FIG. 6, FIG. 9 is a view when seen from arrow IX of FIG. 8, and FIG. 10 is a main part perspective view illustrating a state in which the second detection lever 72 is removed from the state of FIG. 8.

As shown in FIGS. 8 to 10, a horizontal wall 65*h*, a recess 65*j*, and a pair of boss portions 65*k* are formed on the lower portion of the outer surface 65*x* of the side wall 65*a* of the roll paper guide 65.

The horizontal wall 65*h* includes a notch 65*n* extending horizontally at a rear position of the opening 65*b* and having a bottom 65*m* formed in a concave arc. The recess 65*j* positions one end 73*a* of the second compression coil spring 73. The pair of boss portions 65*k* are portions where the pair of screws 68 are screwed together.

The second detection lever 72 includes a cylindrical shaft portion 72*a*, a plate-shaped portions 72*b* extending from both ends of the shaft portion 72*a*, and second protrusions 72*c* formed to bend at the tip end of the plate-shaped portion 72*b*.

The shaft portion 72*a* is inserted into the notch 65*n* of the horizontal wall 65*h*, projects from the inner surface 71*b* of the detecting section cover 71, and is held by the end surface 71*d* of a pressing portion 71*c* inserted into the notch 65*n*. As a result, the shaft portion 72*a* is prevented from coming off from the notch 65*n* and is rotatably supported by the horizontal wall 65*h* and the pressing portion 71*c*. Thereby, the second detection lever 72 is swingably supported by the horizontal wall 65*h* and the pressing portion 71*c* via the shaft portion 72*a*.

The second detection lever 72 is swingably supported via the shaft portion 72*a*; however, the present disclosure is not limited thereto. For example, the second detection lever 72 may be provided on the roll paper guide 65 to be slidable so that the entire second detection lever 72 moves.

The other end 73*b* of the second compression coil spring 73 is pressed against one side surface of the plate-shaped portion 72*b* to urge the second detection lever 72. Further, the other side surface of the plate-shaped portion 72*b* contacts the inner surface 71*b* of the detecting section cover 71, and the swing of the second detection lever 72 is restricted.

The back surface 72*d* of the second protrusion 72*c* is formed on a flat surface, and the tip end 53*d* of the first protrusion 53*b* of the remaining amount detecting section 32 is pressed against the back surface 72*d*.

Operations of the remaining amount detecting section 32 and the detection assistance section 63 described above will be described below.

Figure 11:
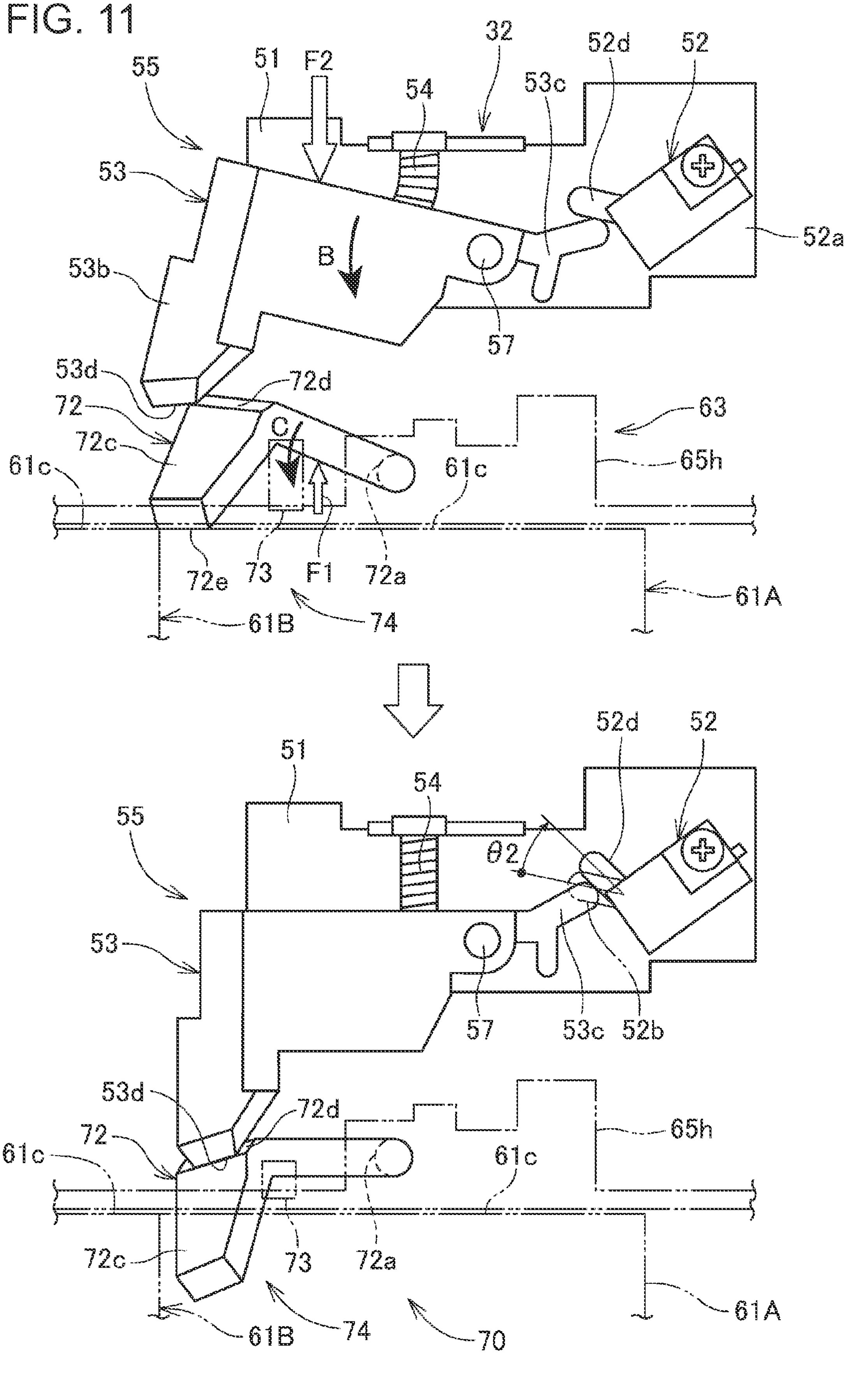
FIG. 11 is an operation diagram illustrating operations of the remaining amount detection mechanism and a detection assistance mechanism.

FIG. 11 is an operation diagram illustrating operations of the remaining amount detecting section 32 and the detection assistance section 63.

In the second roll paper 61A having an outer diameter of a predetermined value or larger than the predetermined value, the tip end 72*e* of the second protrusion 72*c* of the second detection lever 72 of the detection assistance section 63 contacts the side surface 61*c* of the second roll paper 61A.

In this state, the tip end 53*d* of the first protrusion 53*b* of the first detection lever 53 contacts the back surface 72*d* of the second protrusion 72*c*. At this time, the arm portion 53*c* of the first detection lever 53 contacts the detector 52*b* of the detection switch 52. In this state, the detection switch 52 is OFF.

When the outer diameter of the second roll paper 61A gradually becomes smaller From this state and becomes the second roll paper 61B of which the outer diameter is smaller than a predetermined value, the tip end 72*e* of the second detection lever 72 does not contact the side surface 31*c* of the second roll paper 61B. Thereby, the first detection lever 53 swings in the direction of arrow B by the first compression coil spring 54, which has an urging direction opposite to the urging direction of the second compression coil spring 73 and has a larger urging force F2 than the urging force F1 of the second compression coil spring 73. Further, the second detection lever 72 is pushed by the first protrusion 53*b* of the first detection lever 53 and swings in the direction of the arrow C.

As a result, as shown by the white arrow, the second protrusion 72*c* of the second detection lever 72 is in a state of projecting into the roll paper accommodating space 70. At this time, as the arm portion 53*c* of the first detection lever 53 further swings, the detector 52*b* of the detection switch 52 swings clockwise by an angle θ2 from the state before the swing of the first detection lever 53. As a result, the detection switch 52 is turned from OFF to ON, and this on signal is input to the controller 38. The controller 38 controls the display 39 to display the fact that the remaining amount of the second roll paper 61B is low, based on the on signal from the detection switch 52.

In this way, the position where the second protrusion 72*c* of the second detection lever 72 projects from the side wall 65*a* to the inside of the roll paper holder 22, that is, to the roll paper accommodating space 70 is defined as a third position.

Further, the position where a projecting amount of the second protrusion 72*c* of the second detection lever 72 from the side wall 65*a* into the roll paper accommodating space 70 is less than that at the third position or the second protrusion 72*c* does not project is defined as a fourth position. As described above, the second protrusion 72*c* of the second detection lever 72 can move between the third position and the fourth position.

Figure 12:
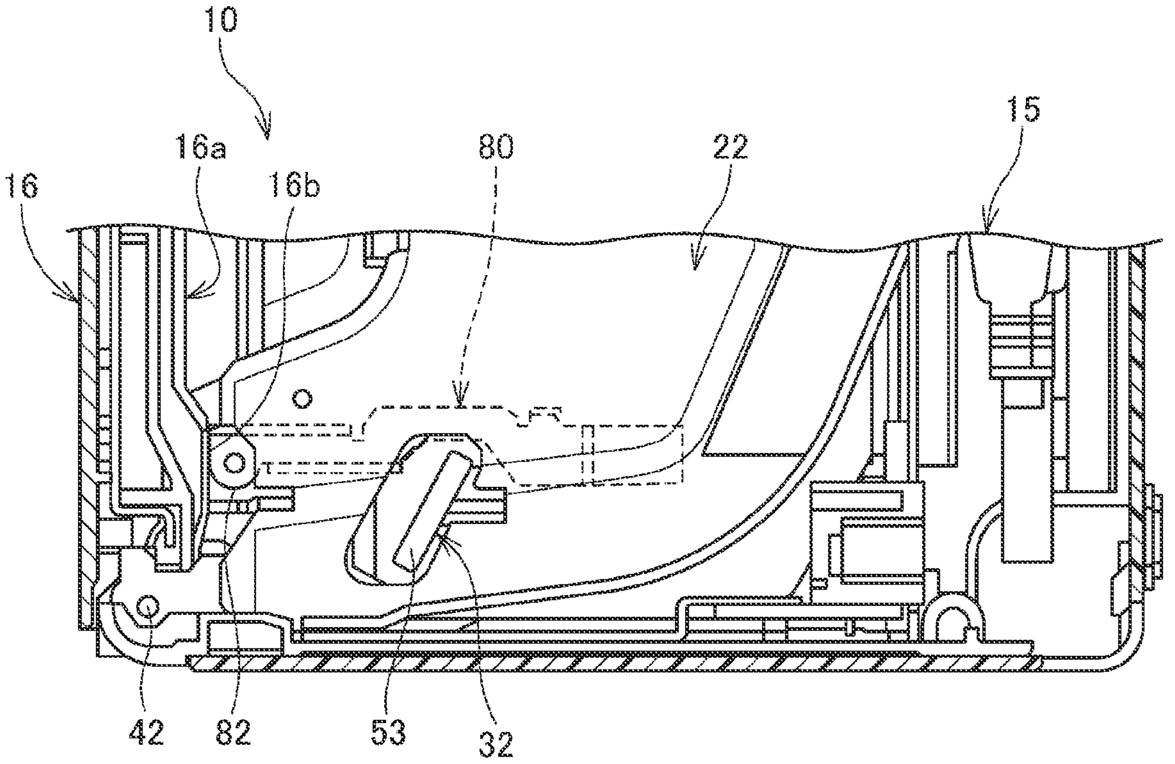
FIG. 12 is a side sectional view illustrating a lower portion of the printing device.

FIG. 12 is a side sectional view illustrating a lower portion of the printing device 10.

The printing device 10 includes a detection state switching section 80 that performs switching so as not to detect the remaining amount of the roll paper when the first roll paper 31 is inserted into the roll paper holder 22 or the first roll paper 31 of which the remaining amount is low is unloaded. That is, the detection state switching section 80 temporarily prevents the first detection lever 53 from projecting into the roll paper holder 22.

The detection state switching section 80 is disposed outside the roll paper holder 22, and the front end of the detection state switching section 80 is pressed against the inner surface 16*a* of the opening/closing cover 16.

As described above, in a state where the opening/closing cover 16 is closed, the remaining amount detecting section 32 is in a state where the remaining amount of the first roll paper 31 can be detected. On the other hand, when the opening/closing cover 16 is opened, the detection state switching section 80 described above operates, and the remaining amount detecting section 32 is in a state where the remaining amount of the first roll paper 31 is not detected. A detailed structure of the detection state switching section 80 will be described below.

Figure 13:
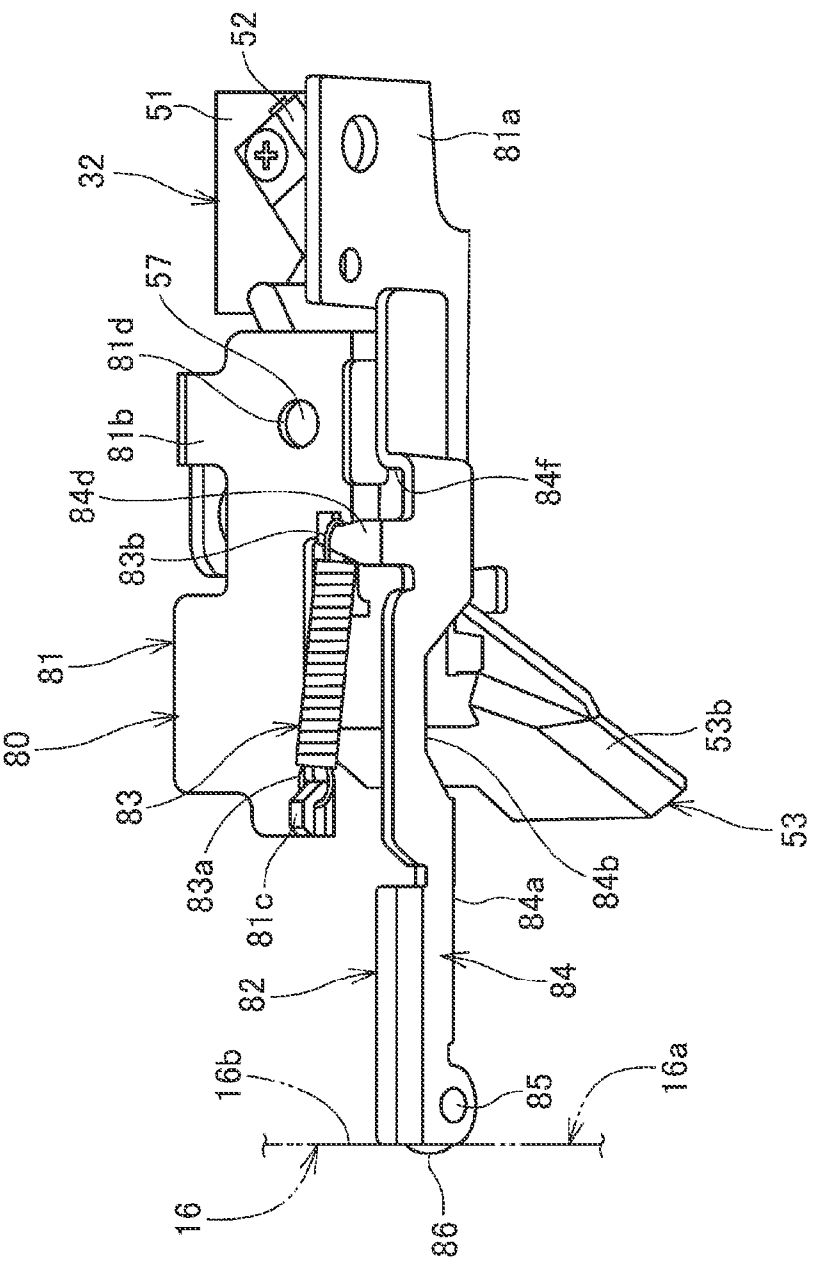
FIG. 13 is a perspective view of a detection state switching section when viewed from diagonally above.
Figure 14:
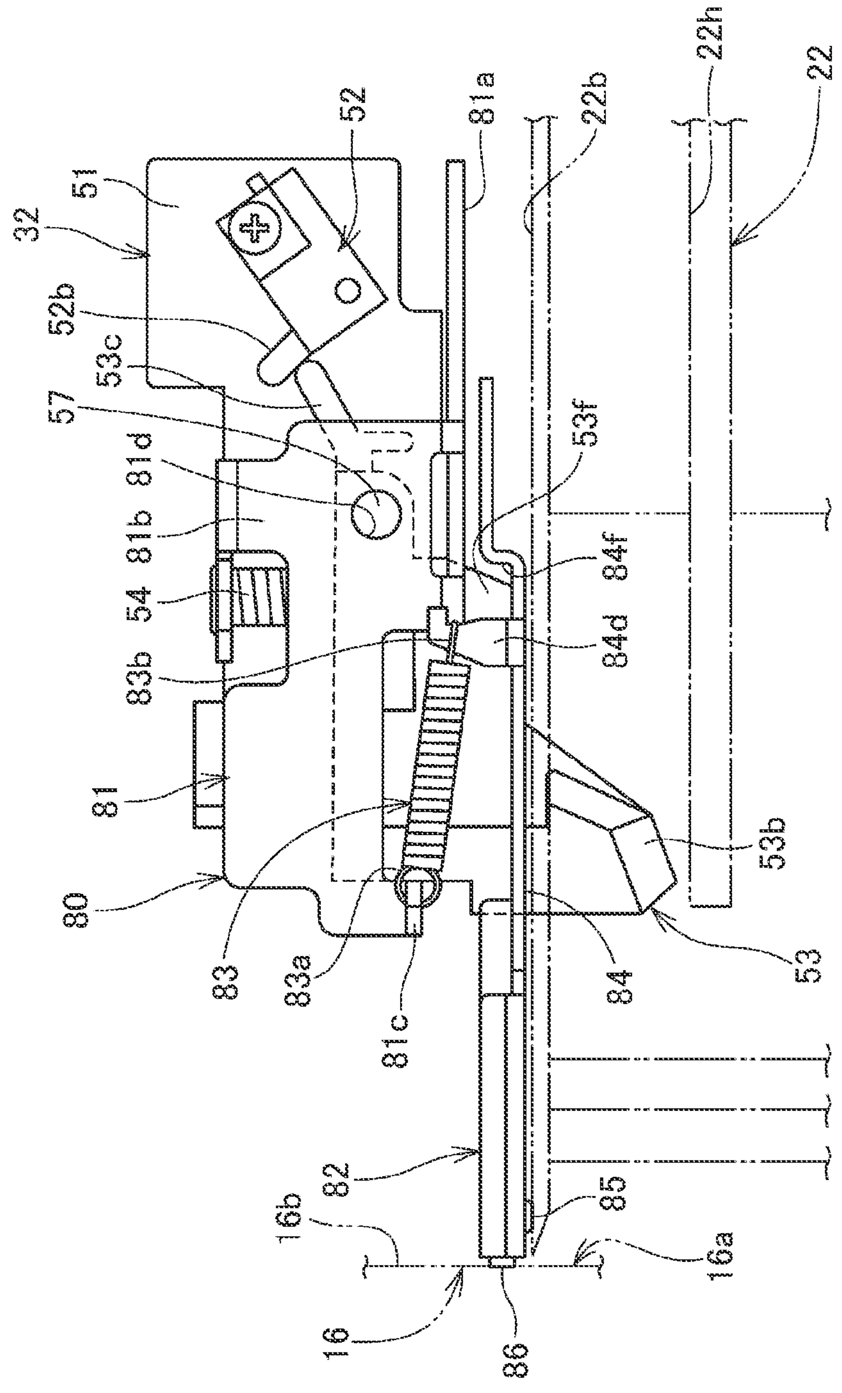
FIG. 14 is a plan view illustrating the detection state switching section.

FIG. 13 is a perspective view of the detection state switching section 80 when viewed from diagonally above and FIG. 14 is a plan view illustrating the detection state switching section 80.

As shown in FIG. 13, the detection state switching section 80 includes a frame portion 81 attached to the case 21 or the base 51 of the remaining amount detecting section 32, an interlocking lever 82 that is supported by the frame portion 81 to be slidable forward and backward, and a tension coil spring 83 that urges the interlocking lever 82 forward. The interlocking lever 82 corresponds to an example of a movable portion.

As shown in FIGS. 13 and 14, the frame portion 81 integrally includes a plate-shaped vertical plate portion 81*a* extending in the front-rear direction and arranged vertically and a plate-shaped lateral plate portion 81*b* extending laterally from the front of the vertical plate portion 81*a*. The lateral plate portion 81*b* includes a spring hook 81*c* provided on the front end to which one end 83*a* of the tension coil spring 83 is hooked, and a shaft support hole 81*d* into which one end of the support shaft 57 is rotatably inserted.

The interlocking lever 82 includes a plate-shaped and long interlocking lever main body 84 extending in the front-rear direction along the vertical plate portion 81*a* of the frame portion 81, and a roller 86 rotatably supported at front end of the interlocking lever main body 84 through a support shaft 85.

The interlocking lever main body 84 includes a recess 84*b* formed in a lower edge 84*a* to open downward, and a spring hook 84*d* that extends laterally from an upper edge 84*c* and on which the other end 83*b* of the tension coil spring 83 is hooked. The recess 84*b* is formed in a substantially trapezoidal shape when seen from the side, which forms a shape that avoids the first protrusion 53*b* of the first detection lever 53.

A step 84*f* is formed at the rear portion of the interlocking lever main body 84. The step 84*f* is formed by bending the interlocking lever main body 84, and projects toward the frame portion 81. The step 84*f* abuts on a corner 53*f* of the first detection lever 53, as will be described later. The corner 53*f* is an end of the lever base 53*a* of the first detection lever 53 along the side wall 22*b*.

The tension coil spring 83 is hooked on the spring hook 81*c* of the frame portion 81 and the spring hook 84*d* of the interlocking lever 82 to urge the interlocking lever 82 forward with respect to the frame portion 81.

FIGS. 13 and 14 show the detection state switching section 80 when the opening/closing cover 16 is closed and the roller 86 of the interlocking lever 82 is pressed against an abutting portion 16*b* of the inner surface 16*a* of the opening/closing cover 16 by the urging force of the tension coil spring 83.

At this time, the first protrusion 53*b* of the first detection lever 53 of the remaining amount detecting section 32 projects into the roll paper holder 22, and is in a state where the remaining amount of the first roll paper 31 can be detected. That is, in FIG. 3, when the first roll paper 31 is accommodated in the roll paper holder 22, in the first roll paper 31A having a relatively large outer diameter, the first protrusion 53*b* contacts the side surface 31*c* of the first roll paper 31A. In the first roll paper 31B having a relatively small outer diameter, the first protrusion 53*b* projects into the roll paper holder 22 without contacting the side surface 31*c* of the first roll paper 31A, and thus the first roll paper 31B is detected as a low remaining amount.

Figure 15:
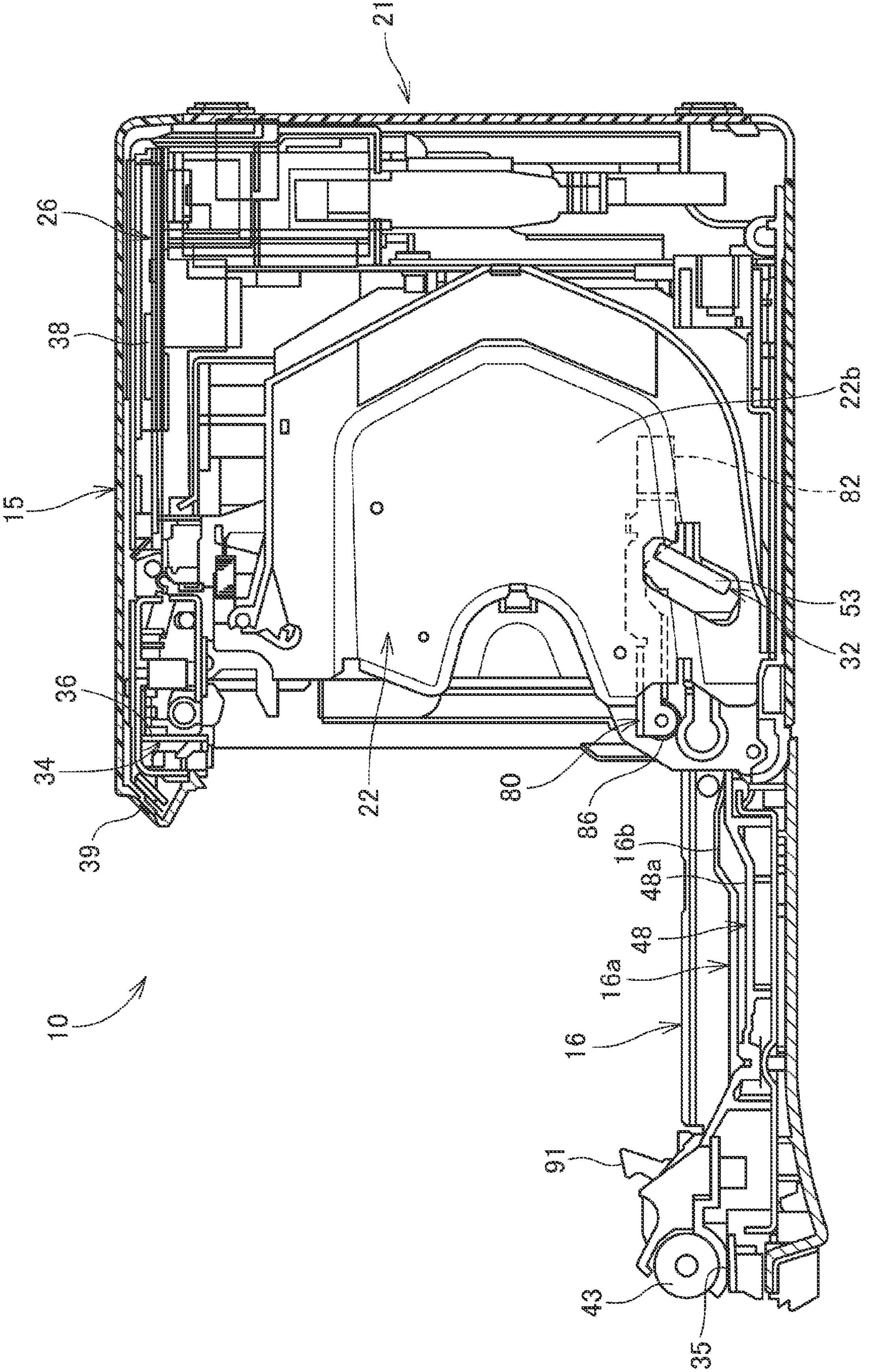
FIG. 15 is a side sectional view illustrating a state in which an opening/closing cover of the printing device is opened.

FIG. 15 is a side sectional view illustrating a state in which the opening/closing cover 16 of the printing device 10 is opened.

The opening/closing cover 16 is opened until it is substantially horizontal to the main body 15. The flat abutting portion 16*b* abutting on the roller 86 of the interlocking lever 82 of the detection state switching section 80 is provided on the left of the inner surface 16*a* of the opening/closing cover 16. The abutting portion 16*b* is a portion projecting from the surface of the front wall 48*a* of the roll paper abutting portion 48 that contacts the outer peripheral surface of the first roll paper 31 accommodated in the roll paper holder 22.

An engaging portion 91 is provided in the vicinity of the platen 43 of the opening/closing cover 16, and when the opening/closing cover 16 is closed, the engaging portion 91 engages with an engaged portion (not shown) provided on the main body 15, and thus the opening/closing cover 16 is maintained in the closed state.

Figure 16:
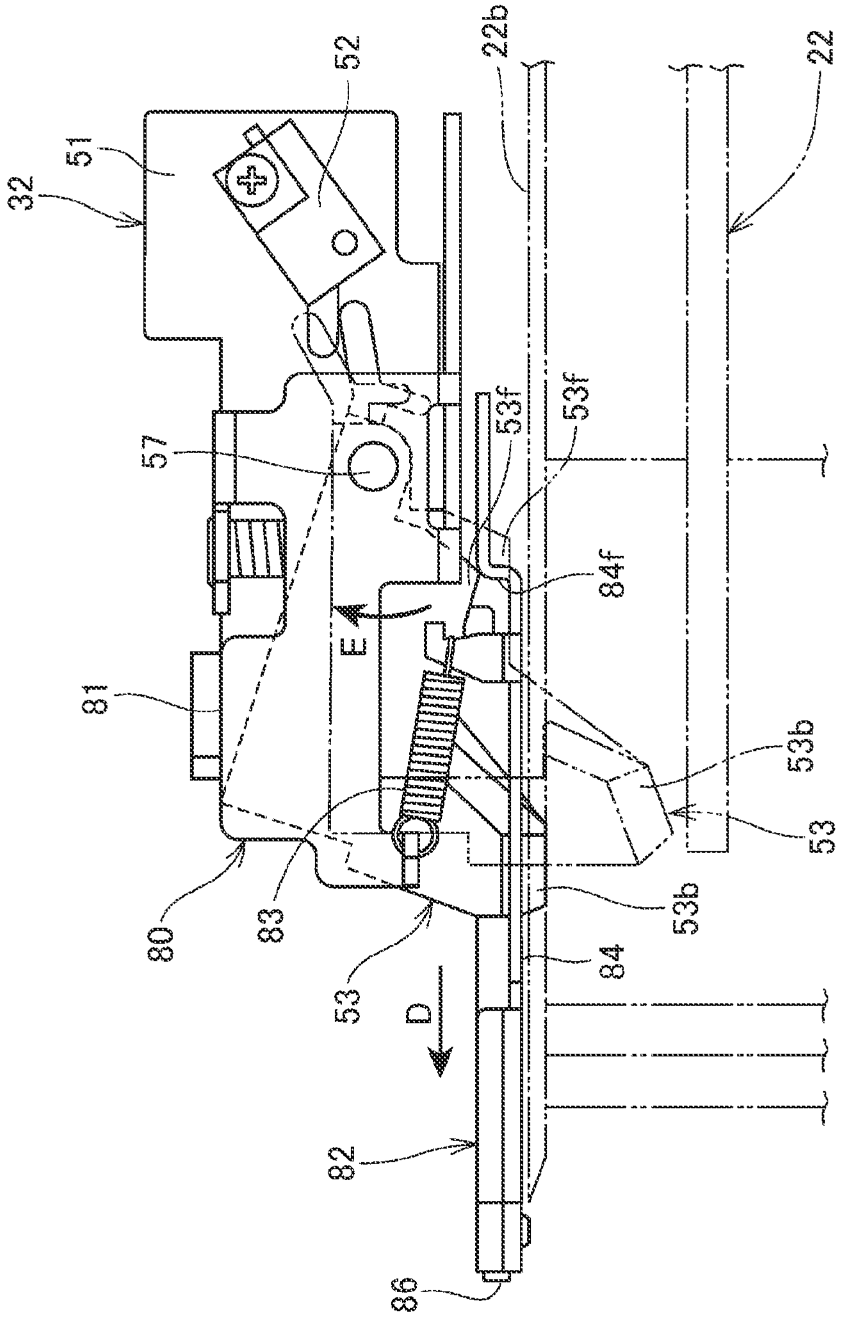
FIG. 16 is a plan view illustrating the detection state switching section when the opening/closing cover is open.

FIG. 16 is a plan view illustrating the detection state switching section 80 when the opening/closing cover 16 is open.

As shown in FIGS. 13 and 16, when the opening/closing cover 16 is opened, the roller 86, that is, the interlocking lever 82, which is in contact with the abutting portion 16*b* of the opening/closing cover 16, slides forward due to the urging force of the tension coil spring 83 as shown by arrow D. At this time, the step 84*f* of the interlocking lever main body 84 moves forward while being in contact with the corner 53*f* of the first detection lever 53. That is, the corner 53*f* is pushed by the step 84*f*, and the first detection lever 53 is pushed as the interlocking lever main body 84 moves.

Thereby, the first detection lever 53 swings about the support shaft 57 as shown by arrow E, and the first protrusion 53*b* gradually moves from the inside of the roll paper holder 22 toward the outside of the roll paper holder 22. In FIG. 16, the movement of the interlocking lever 82 in the direction of arrow D is restricted by a stopper (not shown), and the swing of the first detection lever 53 in the direction of arrow E is also restricted accordingly. That is, in FIG. 16, the first detection lever 53 is in a state of swinging most in the direction of arrow E, and this state is maintained. In this state, the first protrusion 53*b* does not project from the side wall 22*b* of the roll paper holder 22. Therefore, the remaining amount detecting section 32 does not detect the remaining amount of the first roll paper 31.

Assuming that this state is the first state and the state in which the remaining amount of the first roll paper 31 is detected as shown in FIGS. 13 and 14 is the second state, the state shifts from the first state to the second state with the movement of the opening/closing cover 16 from the open position to the closed position. Further, the state shifts from the second state to the first state with the movement of the opening/closing cover 16 from the closed position to the open position.

Further, the positions of the first detection lever 53 and the first protrusion 53*b* shown in FIG. 16 are defined as the first position, and the positions of the first detection lever 53 and the first protrusion 53*b* shown in FIGS. 13 and 14 are defined as the second position. At this time, the first detection lever 53 and the first protrusion 53*b* shift from the first state to the second state by moving from the first position to the second position, and shifts from the second state to the first state by moving from the second position to the first position.

In this way, the detection state switching section 80 prevents the first protrusion 53*b* of the remaining amount detecting section 32 from forcibly projecting into the roll paper holder 22 when the opening/closing cover 16 is opened, and sets the state to be the first state in which the remaining amount detecting section 32 does not detect the remaining amount.

Further, the detection state switching section 80 enables the first protrusion 53*b* of the first detection lever 53 in the remaining amount detecting section 32 to project into the roll paper holder 22 when the opening/closing cover 16 is closed, and sets the state to be the second state in which the remaining amount detecting section 32 is enabled to detect the remaining amount.

In the above, the operation of the detection state switching section 80 when the first roll paper 31 is accommodated in the roll paper holder 22 has been described. Further, the detection state switching section 80 also operates when the right and left roll paper guides 66 and 65 are mounted on the roll paper holder 22 and the second roll paper 61 is accommodated between the roll paper guides 65 and 66.

Unless the first protrusion 53*b* of the first detection lever 53 forcibly projects into the roll paper holder 22 by the detection state switching section 80, the second protrusion 72*c* of the second detection lever 72 does not project to the roll paper accommodating space 70, and thus the remaining amount of the second roll paper 61 is not detected. Further, when the first protrusion 53*b* of the first detection lever 53 can project into the roll paper holder 22 by the detection state switching section 80, the second protrusion 72*c* of the second detection lever 72 can project to the roll paper accommodating space 70, and thus the remaining amount of the second roll paper 61 is detected.

As shown in FIGS. 1, 13, and 16 above, the printing device 10 includes the main body 15, the opening/closing cover 16, the roll paper holder 22, and the remaining amount detecting section 32.

The opening/closing cover 16 is coupled to the main body 15 and moves to the open position or the closed position. The roll paper holder 22 is provided in the main body 15 and can accommodate the first roll paper 31. The remaining amount detecting section 32 detects the remaining amount of the first roll paper 31 accommodated in the roll paper holder 22. The remaining amount detecting section 32 shifts from the first state where the remaining amount of the first roll paper 31 is not detected to the second state where the remaining amount of the first roll paper 31 is detected, with the movement of the opening/closing cover 16 from the open position to the closed position.

With the configuration, since the remaining amount of the first roll paper is not detected by the remaining amount detecting section at the open position of the opening/closing cover, the remaining amount detecting section does not project into the roll paper holder when the first roll paper is loaded and unloaded in and out of the roll paper holder, and thus it is possible to load and unload the first roll paper 31 without any trouble.

Further, as shown in FIGS. 14 to 16, the opening/closing cover 16 has the abutting portion 16*b*, and the main body 15 has the detection state switching section 80. The detection state switching section 80 is pressed by the abutting portion 16*b* with the movement of the opening/closing cover 16 from the open position to the closed position, and shifts the remaining amount detecting section 32 from the first state to the second state.

With the configuration, the abutting portion 16*b* and the detection state switching section 80 abut on each other when the opening/closing cover 16 is closed after the first roll paper 31 is inserted into the roll paper holder 22 or the first roll paper 31 is replaced. As a result, the remaining amount detecting section 32 can be automatically shifted from the first state to the second state, and thus no special operation is required, which can improve usability.

Further, as shown in FIGS. 13 and 16, the detection state switching section 80 includes the interlocking lever 82 that is movably provided on the main body 15 and the tension coil spring 83 that urges the interlocking lever 82 in a direction opposite to the direction in which the interlocking lever 82 is pressed by the abutting portion 16*b*. When the interlocking lever 82 moves in the direction urged by the tension coil spring 83, the interlocking lever 82 presses the remaining amount detecting section 32 to be shifted from the second state to the first state.

With the configuration, when the opening/closing cover 16 is opened, the remaining amount detecting section 32 can be automatically shifted from the second state to the first state by the urging force of the tension coil spring 83, and thus no special operation is required, which can improve usability.

Further, as shown in FIGS. 14 and 16, the remaining amount detecting section 32 shifts from the first state to the second state by moving from the first position where the remaining amount of the first roll paper 31 is not detected to the second position where the remaining amount of the first roll paper 31 is detected.

With the configuration, the remaining amount of the first roll paper 31 is detected by moving the remaining amount detecting section 32 from the first position to the second position, and thus the remaining amount detecting section 32 can have a simple structure using a swinging lever or the like.

Further, the remaining amount detecting section 32 shifts from the second state to the first state with the movement of the opening/closing cover 16 from the closed position to the open position.

With the configuration, when the first roll paper 31 is inserted into the roll paper holder 22 or the opening/closing cover 16 is opened to replace the first roll paper 31, the remaining amount detecting section 32 can be automatically shifted from the second state to the first state. In this way, usability can be improved since no special operation is required.

Further, as shown in FIGS. 5, 11, 14, and 16, the printing device 10 includes the roll paper guide 65 and the detection assistance section 63. The roll paper guide 65 can be installed on the roll paper holder 22, and has a side wall 65*a* that can come into contact with the side surface of the second roll paper 61 having a paper width smaller than that of the first roll paper 31. The detection assistance section 63 is provided on the roll paper guide 65, and assists the remaining amount detecting section 32 in detecting the remaining amount of the second roll paper 61.

The detection assistance section 63 shifts from a third state where the assistance in detecting the remaining amount of the second roll paper 61 is not performed to a fourth state where the assistance in detecting the remaining amount of the second roll paper 61 is performed, with the movement of the opening/closing cover 16 from the open position to the closed position.

With the configuration, the detection assistance section 63 does not assist the remaining amount detecting section 32 in detecting the remaining amount of the second roll paper 61 at the open position of the opening/closing cover 16. Therefore, when the second roll paper of which the side surface can come into contact with the side wall 65*a* of the roll paper guide is loaded and unloaded, the detection assistance section 63 does not project toward the second roll paper 61 and thus it is possible to load and unload the second roll paper 61 without any trouble.

Further, the detection assistance section 63 has the second projection 74 projecting from the side wall 65*a* of the roll paper guide 65, and the second projection 74 moves to a position where the second projection 74 projects from the side wall 65*a* in a state of abutting on the remaining amount detecting section 32, with the movement of the opening/closing cover 16 from the open position to the closed position.

With the configuration, the second projection 74 of the detection assistance section 63 projects to abut on the remaining amount detecting section 32 that moves when the opening/closing cover 16 is closed, and thus the detection assistance section 63 can have a simple structure.

The above-described embodiment illustrates one aspect of the present disclosure, and any modification and application can be made without departing from the spirit of the present disclosure.

For example, as shown in FIG. 13, the tension coil spring 83 is used as an urging member in the detection state switching section 80; however, the present disclosure is not limited thereto, and a torsion coil spring, a leaf spring, or a compression coil spring may be used as the urging member. For example, the remaining amount detecting section may have a structure other than that of the lever shape such as the first detection lever. For example, the remaining amount detecting section may have an optical detection mechanism. For example, the detection assistance section may have a structure other than that of the lever shape such as the second detection lever. The detection state switching section may have a structure other than that of the stepped portion shape and switch the remaining amount detecting section from the first state to the second state.

What is claimed is:

1. A printing device comprising:
- a main body;
- an opening/closing cover coupled to the main body and configured to move to an open position or a closed position;
- a roll paper holder provided in the main body and configured to accommodate a first roll paper;
- a remaining amount detecting section configured to detect a remaining amount of the first roll paper accommodated in the roll paper holder;
- a partition portion configured to be installed on the roll paper holder and having a side wall configured to contact a side surface of a second roll paper having a paper width smaller than that of the first roll paper; and
- a detection assistance section provided in the partition portion and assisting the remaining amount detecting section in detecting a remaining amount of the second roll paper, wherein
- the remaining amount detecting section is configured to shift from a first state in which the remaining amount of the first roll paper is not detected to a second state in which the remaining amount of the first roll paper is detected with movement of the opening/closing cover from the open position to the closed position, and
- the detection assistance section shifts from a third state where the assistance in detecting the remaining amount of the second roll paper is not performed to a fourth state where the assistance in detecting the remaining amount of the second roll paper is performed, with the movement of the opening/closing cover from the open position to the closed position.

2. The printing device according to claim 1, wherein
- the opening/closing cover has an abutting portion,
- the main body has a switching portion, and
- the switching portion is pressed against the abutting portion with the movement of the opening/closing cover from the open position to the closed position to shift the remaining amount detecting section from the first state to the second state.

3. The printing device according to claim 2, wherein
- the switching portion includes a movable portion that is movably provided on the main body and an urging member that urges the movable portion in a direction opposite to a direction in which the movable portion is pressed by the abutting portion, and the movable portion presses the remaining amount detecting section to shift the remaining amount detecting section from the second state to the first state when the movable portion moves in a direction urged by the urging member.

4. The printing device according to claim 1, wherein the remaining amount detecting section shifts from the first state to the second state by moving from a first position where the remaining amount of the first roll paper is not detected to a second position where the remaining amount of the first roll paper is detected.

5. The printing device according to claim 1, wherein the remaining amount detecting section shifts from the second state to the first state with the movement of the opening/closing cover from the closed position to the open position.

6. The printing device according to claim 1, wherein the detection assistance section has a projection projecting from the side wall of the partition portion, and the projection moves to a position where the projection projects from the side wall in a state of abutting on the remaining amount detecting section, with the movement of the opening/closing cover from the open position to the closed position.

* * * * *